United States Patent
Imes et al.

(10) Patent No.: US 12,503,318 B2
(45) Date of Patent: Dec. 23, 2025

(54) APPARATUS AND METHOD FOR ACCUMULATING A STREAM OF ARTICLES WITH MULTIPLE OUTFEED DIRECTIONS

(71) Applicant: ILLINOIS TOOL WORKS INC., Glenview, IL (US)

(72) Inventors: Douglas A Imes, Greer, SC (US); Chadwin R. Jones, Simpsonville, SC (US)

(73) Assignee: ILLINOIS TOOL WORKS INC., Glenview, IL (US)

(*) Notice: Subject to any disclaimer, the term of this patent is extended or adjusted under 35 U.S.C. 154(b) by 104 days.

(21) Appl. No.: 18/606,460

(22) Filed: Mar. 15, 2024

(65) Prior Publication Data

US 2024/0327134 A1 Oct. 3, 2024

Related U.S. Application Data

(60) Provisional application No. 63/454,808, filed on Mar. 27, 2023.

(51) Int. Cl.
| | | |
|---|---|---|
| *B65G 47/71* | (2006.01) | |
| *B65G 47/53* | (2006.01) | |
| *B65G 47/68* | (2006.01) | |
| *B65G 47/69* | (2006.01) | |
| *B65G 47/76* | (2006.01) | |

(52) U.S. Cl.
CPC ............ *B65G 47/71* (2013.01); *B65G 47/53* (2013.01); *B65G 47/68* (2013.01); *B65G 47/766* (2013.01); *B65G 47/69* (2013.01); *B65G 47/76* (2013.01)

(58) Field of Classification Search
CPC ...... B65G 47/71; B65G 47/766; B65G 47/53; B65G 47/68; B65G 47/76; B65G 47/69
USPC .................. 198/347.1, 347.3, 347.4
See application file for complete search history.

(56) References Cited

U.S. PATENT DOCUMENTS 3,506,110 A * 4/1970 Paul .................. B65G 47/5109
 198/433
3,835,979 A * 9/1974 Calvert ................ B65G 47/681
 198/363

(Continued)

FOREIGN PATENT DOCUMENTS

| JP | 2000-53241 A | 2/2000 |
| JP | 2001-322704 A | 11/2001 |

(Continued)

OTHER PUBLICATIONS

EPO, Form EPO Form 1503 03.82, Communication & Ext. EP Search Report for European Patent Appln. EP 24166030, Jun. 28, 2024 (3 pp.) together with EPO Form 1703 01.91TRI (5 pp.).

*Primary Examiner* — James R Bidwell
(74) *Attorney, Agent, or Firm* — Pauley Erickson & Swanson

(57) ABSTRACT

A system for controlling a flow of articles includes an infeed conveyor providing a plurality of articles to the system and conveying articles in a feed direction. A reversible conveyor is at least partially contiguous with and parallel to the infeed conveyor and provides articles to a first outfeed conveyor providing the plurality of articles in the feed direction to a first downstream operation or a second outfeed conveyor providing the plurality of articles in a direction opposite the feed direction to a second downstream operation.

17 Claims, 3 Drawing Sheets

(56) References Cited

U.S. PATENT DOCUMENTS

| | | | | |
|---|---|---|---|---|
| 4,684,118 | A * | 8/1987 | Boss | B65H 29/006 |
| | | | | 53/118 |
| 5,125,782 | A * | 6/1992 | Goldschmidt | B65G 1/06 |
| | | | | 414/285 |
| 5,617,701 | A * | 4/1997 | Brizzi | A24C 5/35 |
| | | | | 53/154 |
| 6,182,812 | B1 * | 2/2001 | Hartness, III | B65G 47/5131 |
| | | | | 198/597 |
| 8,573,380 | B2 * | 11/2013 | Petrovic | B65G 47/5131 |
| | | | | 198/347.4 |
| 9,856,093 | B2 | 1/2018 | Beesley et al. | |
| 11,661,289 | B2 | 5/2023 | Whitten et al. | |
| 2001/0030102 | A1 | 10/2001 | Woltjer et al. | |
| 2014/0116841 | A1 | 5/2014 | Wilkins | |
| 2016/0052726 | A1 * | 2/2016 | Steeber | B65G 47/5127 |
| | | | | 198/347.4 |
| 2016/0145054 | A1 | 5/2016 | Magnusson | |
| 2017/0247197 | A1 * | 8/2017 | Beesley | B65G 47/5104 |
| 2022/0106130 | A1 | 4/2022 | Korte | |
| 2023/0249922 | A1 * | 8/2023 | Senn | B65G 47/082 |
| | | | | 198/347.1 |
| 2023/0339699 | A1 * | 10/2023 | Imes | B65G 23/26 |
| 2024/0246775 | A1 | 7/2024 | Imes | |

FOREIGN PATENT DOCUMENTS

| | | | | |
|---|---|---|---|---|
| WO | WO-0232797 A1 * | 4/2002 | | B65G 47/766 |
| WO | WO 2006/012072 A2 | 2/2006 | | |

* cited by examiner

APPARATUS AND METHOD FOR ACCUMULATING A STREAM OF ARTICLES WITH MULTIPLE OUTFEED DIRECTIONS

CROSS REFERENCE TO RELATED APPLICATION

This application claims the benefit of U.S. Provisional Application, Ser. No. 63/454,808, filed on 27 Mar. 2023. The provisional application is hereby incorporated by reference herein in its entirety and is made a part hereof, including but not limited to those portions which specifically appear hereinafter.

BACKGROUND OF THE INVENTION

Field of the Invention

This invention relates generally to conveyor systems, and more particularly, to a flexible accumulator for conveyor systems.

Description of Prior Art

Current conveyor systems use a variety of systems and processes to more smoothly and efficiently convey items, especially between packaging stages. While conveyors can be used to process a wide variety of items, certain items such as bottles, cans, cartons, etc. are desirably conveyed in predictable volumes for better organization, efficiency, and packing after such items leave the conveyor.

Accumulators may be used which accommodate excess container volume to permit an outflow to equal an inflow when downstream operations are slowed or stopped. Traditional accumulators are used in connection with a single downstream operation or process.

Production flexibility is desirable without duplication of expensive and space-consuming equipment. Therefore, improvements are desired to balance the flow of articles through and within a conveyor system. The claimed invention provides such an improvement by controlling the flow rate of articles on a conveyor system in a flexible manner to provide the ability to outfeed multiple directions, to multiple machines, to a single machine, and/or to act as a machine bypass while still maintaining flow equalization and accumulation capabilities. The subject invention thereby permits efficient use of manufacturing space with a minimum of connecting conveyor sections while also providing line control to allow the infeed of the system and the outfeed(s) of the system to run at speeds independent of each other.

SUMMARY OF THE INVENTION

The invention generally relates to an accumulator that can be flexibly integrated with a manufacturing process, such as a packaging line to optionally feed two or more different packaging processes from a single accumulator and/or selectively bypass a process downstream of an accumulator. The general object of the invention can be attained, at least in part, through a system for controlling a flow of articles. The system includes an outfeed conveyor section driven in either direction to convey articles in either direction. A preferred system includes a flow through outfeed conveyor and a counterflow outfeed conveyor.

The resulting system provides first in/first out, pressureless accumulation where the infeed and outfeed conveyors of the system can run at independent speeds with the difference between these speeds resulting in accumulation or deaccumulation of the system. Such functionality is preferably accomplished with a reversible conveyor connected with respect to a first outfeed conveyor and an opposite second outfeed conveyor.

A preferred system includes an infeed conveyor providing a plurality of articles to the system, the infeed conveyor conveying articles in a feed direction. At least one reversible conveyor is positioned relative to the infeed conveyor and is capable of conveying articles in the feed direction and in a direction opposite the feed direction, wherein the reversible conveyor is at least partially contiguous with and parallel to the infeed conveyor. Depending on the desired operation, a first outfeed conveyor provides the plurality of articles in the feed direction to a first downstream operation and a second outfeed conveyor provides the plurality of articles in a direction opposite the feed direction to a second downstream operation.

Other objects and advantages will be apparent to those skilled in the art from the following detailed description taken in conjunction with the appended claims and drawings.

DETAILED DESCRIPTION OF THE INVENTION

The present invention provides a container flow equalizer for use on a conveyor system. The invention includes a system for controlling a flow of articles as articles are conveyed and processed through a conveyor system. The invention also includes a method for controlling the flow of articles.

Figure 1:
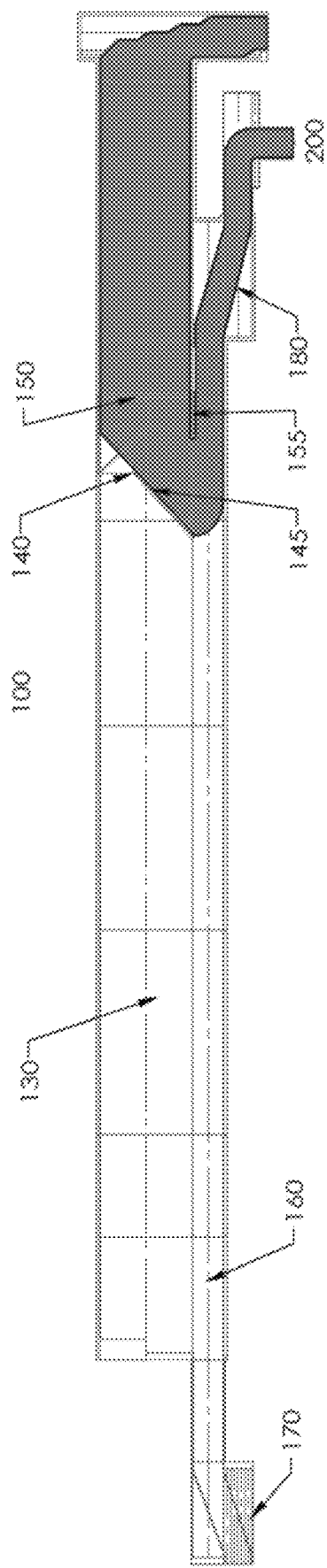
FIG. 1 shows a schematic plan view of a system for controlling a flow rate of articles with a plurality of articles accumulated adjacent a second outfeed conveyor, flowing opposite of the infeed, according to one embodiment of the invention.
Figure 2:
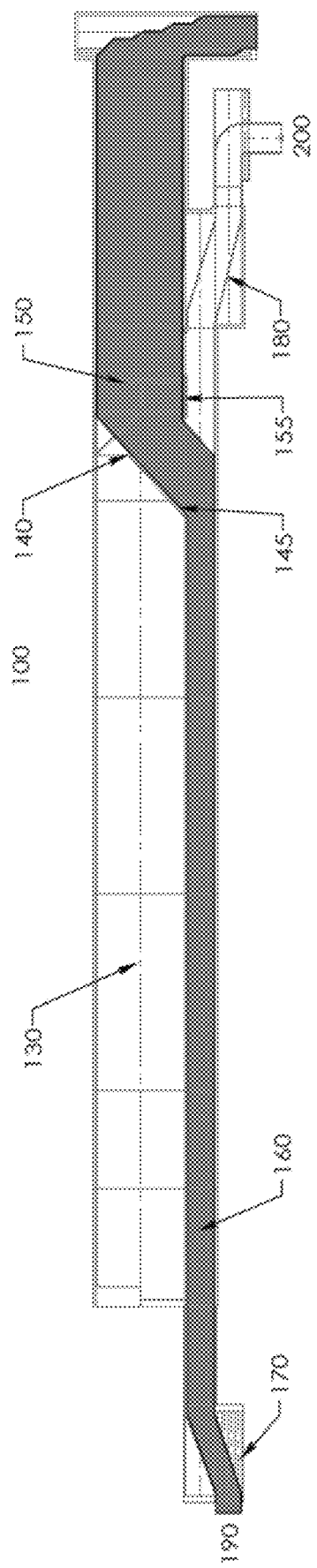
FIG. 2 shows a schematic plan view of a system for controlling a flow rate of articles, flowing in the same direction as infeed, according to one embodiment of the invention.
Figure 3:
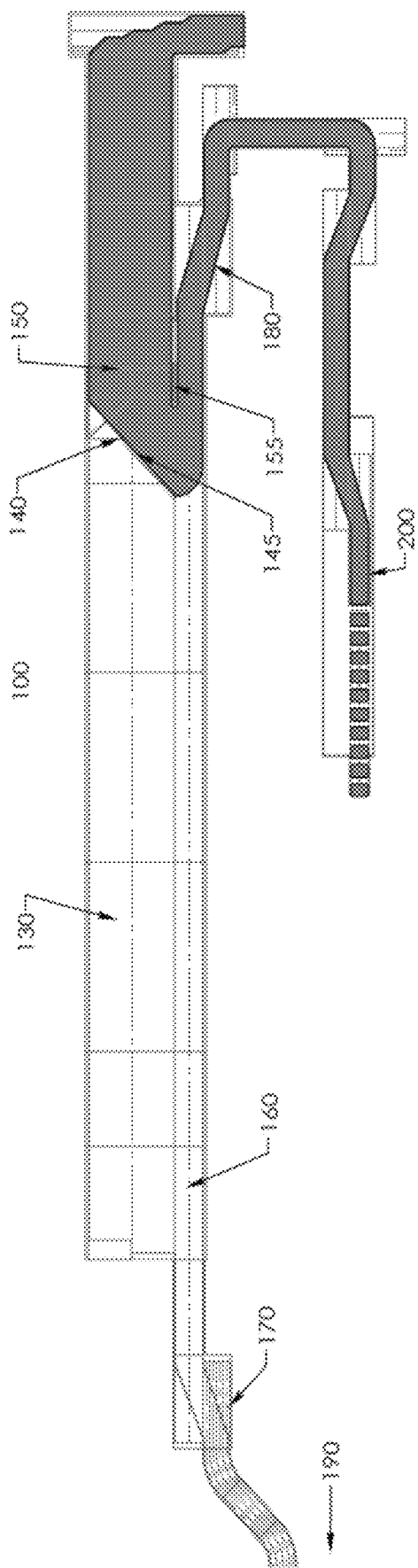
FIG. 3 shows a schematic plan view of the system of FIG. 2 as representationally incorporated into two downstream operations, according to one embodiment of the invention.

FIGS. 1-3 show a system 100 for controlling a flow of articles. The system 100 is incorporated into two or more conveyor sections with at least an infeed conveyor 130; a reversible conveyor 160; a first outfeed conveyor 170; and a second outfeed conveyor 180. In a preferred embodiment, the infeed conveyor speed is independent of the outfeed conveyor(s) speed(s).

The infeed conveyor 130 includes an inlet for articles into the system and provides a flow of articles to and through the system 100. The flow of articles from the infeed conveyor 130 is optimally a generally pressureless flow in that trailing articles do not exert pressure on leading articles through the line. The outfeed conveyors 170, 180 include outlets of the system and provides articles to preferably two or more downstream operations. Likewise, the flow of articles from the outfeed conveyors 170, 180 is optimally a generally pressureless flow. The downstream operation may include fillers, labelers, cartoners, case packers, palletizers and/or other devices and/or operations. For example, in one illustrative embodiment shown in FIG. 3, a first downstream operation 190 could be a cartoner and a second downstream operation 200 could be a case packer. As such, a manufacturer could divert articles to be packaged in groups of six in one instance and later channel the same articles to be packaged in groups of twenty-four, all from the same original stream of articles.

The infeed conveyor 130 provides the plurality of articles to the system 100 in a feed direction. As shown in FIGS. 1-3, such a feed direction would be right to left across the schematic. The at least one reversible conveyor 160 is preferably positioned at least partially contiguous with and generally parallel with the infeed conveyor 130. The reversible conveyor 160 is preferably capable of conveying articles in the feed direction and in a direction opposite the feed direction. Articles thereby flow into the system on the infeed conveyor 130 and are moved or diverted onto the reversible conveyor 160 and on to a desired outfeed conveyor 170, 180.

As shown in the figures, the first outfeed conveyor 170 is positioned to provide the plurality of articles in the feed direction to the first downstream operation 190. The second outfeed conveyor 180 provides the plurality of articles in a direction opposite the feed direction to the second downstream operation 200. It is preferable though not necessary that the first downstream operation 190 is a different operation than the second downstream operation 200.

As shown, a preferred embodiment of the invention includes the first outfeed conveyor 170 and the second outfeed conveyor 180 positioned at opposite ends of the reversible conveyor 160. However, alternative embodiments may include outfeed conveyors 170, 180 positioned at various positions relative to the reversible conveyor 160, such as in intermediate positions along the reversible conveyor 160.

A dynamic guide 140 is preferably positioned across and just above the infeed conveyor 130 and is moveable between ends of the infeed conveyor 130. The dynamic guide 140 is configured to engage and route articles in desired positions on the infeed conveyor 130 and/or the reversible conveyor 160. The dynamic guide 140 is preferably configured to move along a length of the infeed conveyor 130 and block or unblock articles to proactively accumulate or deaccumulate articles along the infeed conveyor 130 based on various system requirements. The dynamic guide 140 may include an integrated conveyor 145 for urging articles into position along the infeed conveyor 130 and/or the reversible conveyor 160.

As shown in the figures, the dynamic guide 140 extends above the infeed conveyor 130 at an angle relative to perpendicular from the infeed conveyor 130. Preferably, the dynamic guide 140 extends at an angle that opens up toward the feed direction of the infeed conveyor 130. Importantly, the dynamic guide 140 preferably extends at least partially over the adjacent reversible conveyor 160 to urge the articles completely into the first outfeed conveyor 170 or the second outfeed conveyor 180, depending on the direction of motion of the reversible conveyor 160.

The infeed conveyor 130 may further include an outrigger 150 extending across the infeed conveyor 130 adjacent to the dynamic guide. The outrigger 150 preferably extends at a height above the infeed conveyor 130 such as to not interfere with the movement of the articles. However, the outrigger 150 includes a shoe 155 at a distal end for maintaining alignment of the flow of articles. The shoe 155 preferably acts as a guardrail for the flow of articles into the first outfeed conveyor 170 and/or the second outfeed conveyor 180 depending on the direction of the reversible conveyor 160.

As shown in the figures, the preferred system 100 includes the infeed conveyor 130 wider than the reversible conveyor 160. More preferably, the infeed conveyor 130 is two to four times wider than the reversible conveyor 160. In this manner, accumulation can take place on the relatively large footprint of the infeed conveyor 130 while directed article flow takes place on the reversible conveyor 160.

Further, the reversible conveyor 160 is preferably parallel to the second outfeed conveyor 180 and in linear alignment with the first outfeed conveyor 170 but linearly offset from the second outfeed conveyor 180.

An associated method for controlling a flow of articles includes providing a flow of articles to the infeed conveyor 130 in a feed direction; flowing the articles along the reversible conveyor 160 in a selectable the feed direction or direction opposite the feed direction; providing the flow of articles to the first outfeed conveyor 170 in the feed direction and to the first downstream operation 190; reversing the reversible conveyor 160; and providing the flow of articles to the second outfeed conveyor 180 in the direction opposite the feed direction to the second downstream operation 200.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

The invention claimed is:

1. A system for controlling a flow of articles, comprising:
an infeed conveyor providing a plurality of articles to the system, the infeed conveyor conveying articles in a feed direction;
at least one reversible conveyor capable of conveying articles in the feed direction and in a direction opposite the feed direction, wherein the reversible conveyor is at least partially contiguous with and parallel to the infeed conveyor;
a first outfeed conveyor providing the plurality of articles in the feed direction to a first downstream operation; and
a second outfeed conveyor providing the plurality of articles in a direction opposite the feed direction to a second downstream operation.

2. The system of claim 1 wherein the first outfeed conveyor and the second outfeed conveyor are positioned at opposite ends of the reversible conveyor.

3. The system of claim 1 further comprising a dynamic guide positioned across the infeed conveyor and moveable between ends of the infeed conveyor.

4. The system of claim 3 wherein the dynamic guide includes an integrated conveyor.

5. The system of claim 3 wherein the dynamic guide extends above the infeed conveyor at an angle relative to the infeed conveyor.

6. The system of claim 3 wherein the infeed conveyor includes an outrigger extending across the infeed conveyor adjacent to the dynamic guide.

7. The system of claim 6 wherein the outrigger includes a shoe at a distal end for maintaining alignment of the flow of articles.

8. The system of claim 5 wherein the dynamic guide extends at least partially over the reversible conveyor.

9. The system of claim 1 wherein the infeed conveyor is wider than the reversible conveyor.

10. The system of claim 9 wherein the infeed conveyor is two to four times wider than the reversible conveyor.

11. The system of claim 1 wherein the reversible conveyor is parallel to the second outfeed conveyor.

12. The system of claim 1 wherein the reversible conveyor is in linear alignment with the first outfeed conveyor and linearly offset from the second outfeed conveyor.

13. The system of claim 1 wherein the first downstream operation is different than the second downstream operation.

14. A method for controlling a flow of articles, comprising:
   providing a flow of articles to an infeed conveyor in a feed direction;
   flowing the articles along a reversible conveyor in a selectable the feed direction or direction opposite the feed direction;
   providing the flow of articles to a first outfeed conveyor in the feed direction and to a first downstream operation;
   reversing the reversible conveyor; and
   providing the flow of articles to a second outfeed conveyor in the direction opposite the feed direction to a second downstream operation.

15. The method of claim 14 further comprising moving a dynamic guide along a length of the infeed conveyor to accumulate articles along the infeed conveyor.

16. The method of claim 14 further comprising providing the flow of articles from the reversible conveyor to the first outfeed conveyor in a linear manner.

17. The method of claim 14 further comprising providing the flow of articles from the reversible conveyor to the second outfeed conveyor in a linearly offset manner.

* * * * *